US010984828B1

(12) United States Patent
Huang et al.

(10) Patent No.: US 10,984,828 B1
(45) Date of Patent: Apr. 20, 2021

(54) SLIDERS WITH LOW ASPECT RATIO

(71) Applicant: Western Digital Technologies, Inc., San Jose, CA (US)

(72) Inventors: Weidong Huang, Palo Alto, CA (US); Xiaojuan Ran, Shenzhen (CN); John Herber, Muntilupa (PH); Biao Sun, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/946,539

(22) Filed: Jun. 26, 2020

(51) Int. Cl.
  *G11B 5/60* (2006.01)
  *G11B 5/48* (2006.01)

(52) U.S. Cl.
  CPC .......... *G11B 5/6082* (2013.01); *G11B 5/4826* (2013.01); *G11B 5/6005* (2013.01)

(58) Field of Classification Search
  None
  See application file for complete search history.

(56) References Cited

U.S. PATENT DOCUMENTS

| | | | | |
|---|---|---|---|---|
| 4,212,044 A | * | 7/1980 | Plotto | G11B 5/60 360/129 |
| 4,225,891 A | * | 9/1980 | Plotto | G11B 5/60 360/122 |
| 4,670,806 A | * | 6/1987 | Ghose | G11B 5/60 360/235.7 |
| 5,196,974 A | * | 3/1993 | Higashiya | G11B 5/60 360/236.8 |
| 5,963,396 A | * | 10/1999 | Burga | G11B 5/6005 360/236.1 |
| 6,144,528 A | | 11/2000 | Anaya-Dufresne et al. | |
| 6,606,222 B1 | * | 8/2003 | Ryun | G11B 5/6005 360/236.5 |
| 6,693,768 B1 | | 2/2004 | Crue et al. | |

(Continued)

FOREIGN PATENT DOCUMENTS

WO 2001029827 A3 9/2001

OTHER PUBLICATIONS

A. N. Murthy et al., "Analysis of Surface Textured Air Bearing Sliders with Rare faction Effects," Tribology Letters 28, Article No. 251 (2007).

(Continued)

*Primary Examiner* — Jefferson A Evans
(74) *Attorney, Agent, or Firm* — Jacobsen IP Law; Krista S. Jacobsen

(57) ABSTRACT

Disclosed herein are embodiments of sliders in which the length of the slider is less than or equal to its width. Also disclosed are data storage devices (e.g., hard disk drives) comprising such sliders. The sliders may include one or more air-bearing surface features to compensate for the lower aspect ratio and to meet performance targets (fly height, roll stiffness, etc.). Such features may include, for example, a trailing-edge pad (which may include an efficiency-flattening hole), a first cavity between a first side of the trailing-edge pad and a first side edge, and a non-intersecting second cavity between a second side of the trailing-edge pad and a second side edge. A slider may also or alternatively include a leading pad and, in some embodiments, a particle trapping structure between the leading pad and the slider's leading edge.

30 Claims, 11 Drawing Sheets

(56) References Cited

U.S. PATENT DOCUMENTS

| | | | | |
|---|---|---|---|---|
| 6,937,440 | B2* | 8/2005 | Rajakumar | G11B 5/6082 360/236.2 |
| 7,054,108 | B2* | 5/2006 | Boutaghou | G11B 5/6005 360/235.4 |
| 7,184,244 | B1* | 2/2007 | Haddock | G11B 5/6005 360/235.7 |
| 7,634,850 | B2 | 12/2009 | Tanaka | |
| 7,787,216 | B2 | 8/2010 | Hashimoto et al. | |
| 8,786,983 | B1 | 7/2014 | Liu et al. | |
| 9,691,422 | B1 | 6/2017 | Hu | |
| 9,881,639 | B2 | 1/2018 | Davis et al. | |
| 10,354,685 | B1 | 7/2019 | Hu et al. | |
| 2004/0264053 | A1* | 12/2004 | Pendray | G11B 5/54 360/236.3 |
| 2005/0231852 | A1 | 10/2005 | Tian et al. | |
| 2006/0215323 | A1 | 9/2006 | Mahadev et al. | |
| 2009/0002891 | A1* | 1/2009 | Hanyu | G11B 5/6082 360/236.4 |
| 2009/0310258 | A1* | 12/2009 | Hanyu | G11B 5/6005 360/235.4 |
| 2011/0122532 | A1* | 5/2011 | Bolasna | G11B 5/6005 360/236.5 |
| 2011/0157748 | A1* | 6/2011 | Hanyu | G11B 5/6005 360/235.4 |
| 2018/0185977 | A1 | 7/2018 | Smith et al. | |
| 2018/0185978 | A1 | 7/2018 | Smith et al. | |

OTHER PUBLICATIONS

R. E. Fontana et al., "Processing and modeling options for advanced thin film magnetoresistrve head structures," 1999 IEEE International Magnetics Conference (INTERMAG), Kyongju, Korea, 1999, pp. BA03-BA03.

* cited by examiner

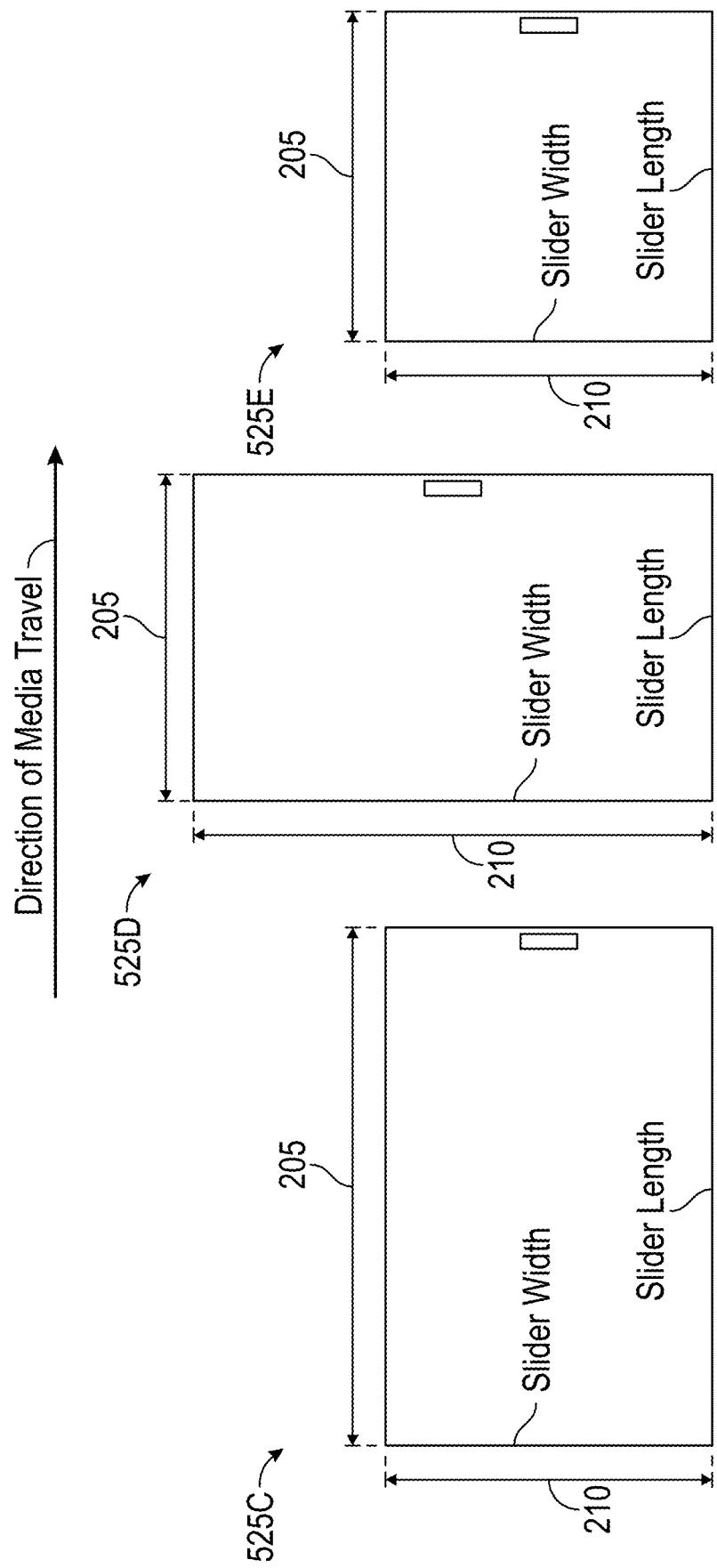

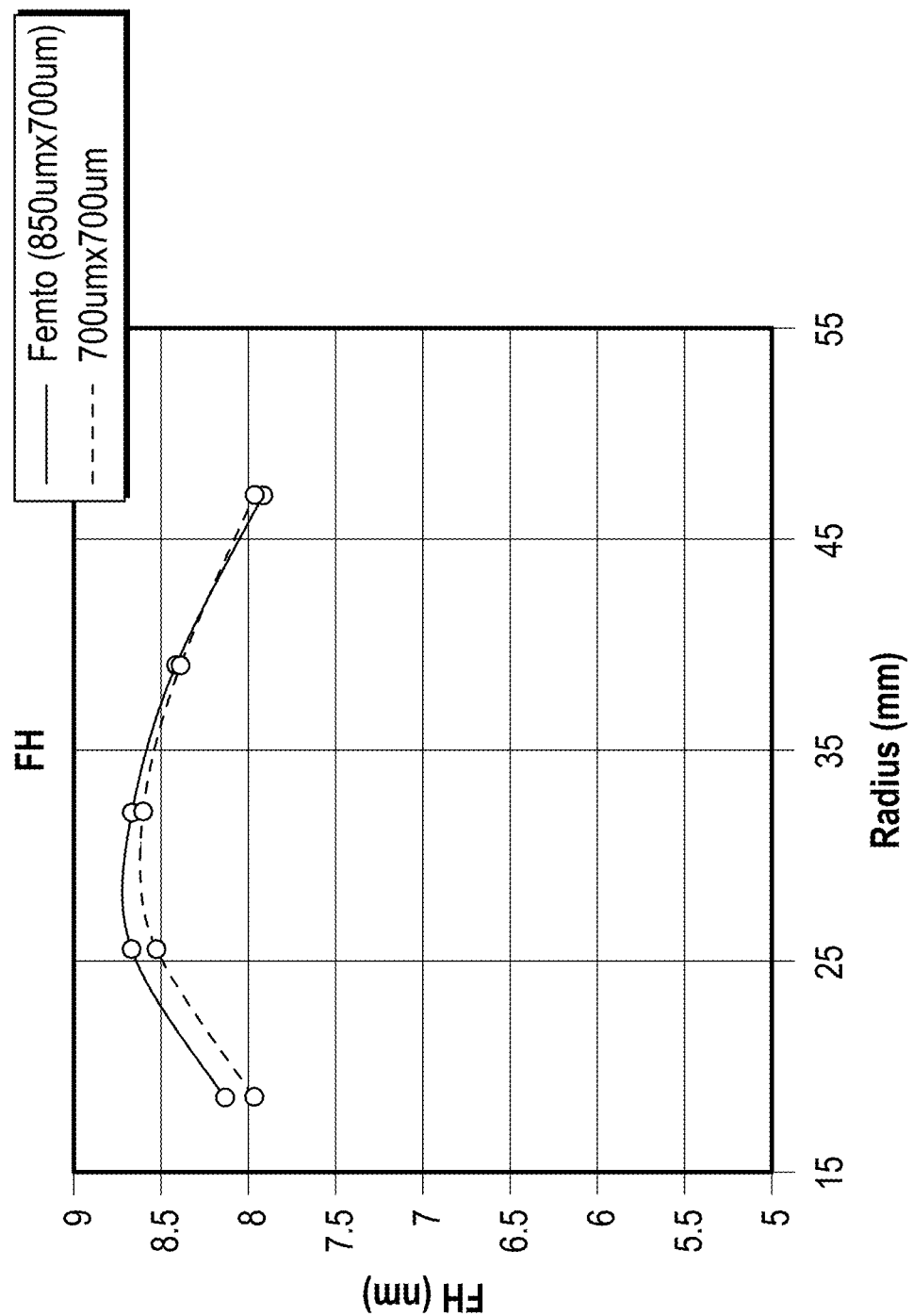

SLIDERS WITH LOW ASPECT RATIO

BACKGROUND

Magnetic storage systems, such as hard disk drives, are used to store large amounts of information. A magnetic head in a magnetic storage system typically includes a read/write transducer for retrieving and storing magnetically encoded information on a magnetic recording medium, such as a disk. A suspended slider supports the magnetic head. The slider provides mechanical support for the magnetic head and the electrical connections between the magnetic head and the rest of the magnetic storage system.

During operation, the slider floats a small distance above the magnetic recording medium (e.g., a hard disk), which rotates at high speeds. Components of a disk drive move the slider and, therefore, the magnetic head to a desired radial position over the surface of the rotating disk, and the magnetic head reads or writes information. The slider rides on a cushion or bearing of air created above the surface of the disk as the disk rotates at its operating speed. The slider has an air-bearing surface (ABS) that faces the disk. The ABS is designed to generate an air-bearing force that counteracts a preload bias that pushes the slider toward the disk. The ABS causes the slider to fly above and out of contact with the disk.

Increasing areal density (a measure of the quantity of information bits that can be stored on a given area of disk surface) is one of the ever-present goals of hard disk drive design evolution, and it has led to the development and implementation of various approaches to reduce the disk area needed to record a bit of information. An important factor affecting areal density is the distance between the read/write transducer and the recording surface, referred to as the fly height. It is desirable to fly the transducer very close to the medium to enhance transition detection. Some level of fly height stability can be achieved with proper suspension loading and by shaping the ABS so that it has desirable aerodynamic characteristics.

Another important factor affecting fly height is the slider's resistance to changing conditions, such as a change in the relative air speed and direction, and variations in temperature. If the read/write transducer's fly height does not stay nearly constant during changing conditions, data transfer between the read/write transducer and the recording medium may be adversely affected. Fly height is further affected by the physical characteristics of the slider such as the shape of the ABS.

Some sliders today have trailing air-bearing pads with small widths in part to attempt to minimize variations in fly height. Unfortunately, however, narrow trailing air-bearing pads can cause the slider to roll from side to side as it flies, which degrades the minimum fly height sigma (variance).

Prior approaches to achieve a slider with a stiffer air bearing and roll include increasing the dimensions of the side pads, particularly in the direction of the slider's width. This approach, however, is limited by the IDEMA (International Disk Drive Equipment and Materials Association) standards (e.g., µFemto, µFemto-L, etc.). Another approach is to create a negative-pressure ABS feature by, for example, second-layer etching. As suggested by its name, however, this approach requires an additional etching step during the manufacturing process and is therefore undesirable from efficiency and cost perspectives.

High-volume magnetic thin film head slider fabrication typically involves high precision subtractive machining performed in discrete material removal steps. Slider processing starts with a completed thin film head wafer consisting of tens of thousands of devices, and is completed when all the devices are individuated and meet numerous and stringent specifications. Each individual device ultimately becomes a slider.

Precise control of the critical dimensions of the read/write transducer's read head element and write head element can be achieved via machining and lapping performed during the manufacturing process. It is desirable from a performance perspective to able to control the alignment/positions of the read and write portions of the head relative to each other (e.g., to control the writer's position while leaving the reader at a particular stripe height). For optimum yield, performance, and stability, it is desirable to have precise dimensional control over both the reader and writer elements.

Manufacturing improvements affecting the magnetic core width (MCW) (as well as the magnetic erase width (MEW), magnetic write width (MWW), magnetic interference width (MIW), and other related magnetic core measures) would benefit areal density because the MCW effectively determines the width of a magnetic bit recorded by the write head. Furthermore, the single largest contributor to the overall MCW sigma is typically the "within row-bar" sigma. Even though manufacturing processes are developed to produce read-write heads having an MCW as close as possible to a desired MCW for the system, some thin-film and other manufacturing processes (e.g., lithography, etching, rough lapping, material elasticity, etc.) experience inherent variations that make it challenging to achieve the desired MCW for every read-write head manufactured.

Furthermore, prior approaches achieving machining efficiencies include using lapping processes to scale the size of the polishing media, and using grinding processes to scale the abrasive size and the binder material (e.g., using smaller abrasive sizes and improved binder materials). Both of these approaches increase manufacturing time and cost, and they also reduce the expected lifespan of the slider.

Thus, it would be desirable to provide a slider design that both improves air bearing roll sigma and can also be manufactured using more efficient manufacturing processes that allow for better dimensional control over both the reader and writer elements.

SUMMARY

This summary represents non-limiting embodiments of the disclosure.

Disclosed herein are embodiments of low-aspect-ratio (low-AR) sliders (their length is less than or equal to their width). Also disclosed are head gimbal assemblies and data storage devices (e.g., hard disk drives) comprising such low-AR sliders.

In some embodiments, a slider comprises a leading edge having a first length, a trailing edge having a second length, a first side edge having a third length, a second side edge having a fourth length, wherein at least one of the first length or the second length is greater than or equal to at least one of the third length or the fourth length. In some embodiments, each of the third and fourth lengths is less than 850 microns. In some embodiments, the first, second, third, and fourth lengths are substantially equal. In some embodiments, each of the first, second, third, and fourth lengths is about 700 microns.

In some embodiments, the slider further comprises a trailing-edge pad, a first cavity between a first side of the trailing-edge pad and the first side edge, and a second cavity between a second side of the trailing-edge pad and the second side edge, the second cavity not intersecting the first cavity. In some embodiments, at least one of the first or second cavities comprises at least two surfaces bounded by a wall. In some embodiments, the at least two surfaces comprise a first surface at a first level and a second surface at a second level that is different from the first level.

In some embodiments, the slider further comprises a leading pad disposed between the first and second cavities and the leading edge and separated from the first and second cavities by a chasm, the leading pad having a back edge at a first distance from the leading edge. In some embodiments, a ratio of a maximum cavity length to the first distance is greater than about 1.25.

In some embodiments, the trailing-edge pad comprises an efficiency-flattening hole.

In some embodiments, a slider comprises a leading surface, a trailing surface, a first side surface, a second side surface, and an air-bearing surface (ABS) comprising a leading pad. In some embodiments, the leading pad comprises a center protrusion, a first side protrusion, and a second side protrusion, each of the center protrusion, first side protrusion, and second side protrusion extending toward the leading surface. In some embodiments, a width of the slider is greater than or equal to a length of the slider. It is noted while "ABS" is generally used in this disclosure to refer to a slider surface facing the media, it is not intended to limit the environment inside the disk drive. In various embodiments, the disk drive may include air, or various compositions of gases, e.g., predominately helium in a sealed drive.

In some embodiments, a roll stiffness of the slider is greater than about 0.013 NMm/rad.

In some embodiments, each of the width of the slider and the length of the slider is between about 650 microns and about 800 microns. In some embodiments, the length of the slider is substantially equal to the width of the slider. In some embodiments, the length of the slider is about 700 microns.

In some embodiments, the slider further comprises at least one particle trapping structure disposed between the leading pad and the leading surface. In some embodiments, the particle trapping structure comprises a plurality of segments, wherein, in an orientation in which the ABS of the slider is oriented upward, a level of each of the plurality of segments is below a base of the leading pad. In some embodiments, the at least one particle trapping structure is adjacent to a base of the leading pad.

In some embodiments, the ABS further comprises a cavity adjacent to the trailing surface, the cavity being enclosed by a wall, the wall being separate from the leading pad. In some embodiments, a ratio of a maximum cavity length to a distance between the leading surface and a back edge of the leading pad is greater than about 1.2. In some embodiments, the ratio is at least 1.3.

In some embodiments, a slider comprises a trailing pad comprising an efficiency flattening hole, a leading edge, a trailing edge parallel to the leading edge, a first side edge intersecting and perpendicular to both the leading edge and the trailing edge, a second side edge intersecting and perpendicular to both the leading edge and the trailing edge, wherein a length of the leading and trailing edges is greater than or equal to a length of the first and second side edges.

In some embodiments, the efficiency flattening hole comprises a first level and a second level, the second level being below the first level in an orientation in which the trailing pad is oriented upward, and the first level comprises a protrusion toward the trailing edge. In some embodiments, in the orientation in which the trailing pad is oriented upward, the second level is between about 300 nm and about 2000 nm below the first level.

In some embodiments, the length of the leading and trailing edges and the length of the first and second side edges is less than 850 microns. In some embodiments, the length of the leading and trailing edges is substantially equal to the length of the first and second side edges. In some embodiments, the length of the first and second side edges is about 700 microns.

BRIEF DESCRIPTION OF THE DRAWINGS

Objects, features, and advantages of the disclosure will be readily apparent from the following description of certain embodiments taken in conjunction with the accompanying drawings in which:

FIGS. 5A, 5B, and 5C compare the aspect ratio of a conventional slider to the aspect ratios of exemplary sliders in accordance with some embodiments.

FIGS. 6A, 6B, 6C, and 6D compare the performance of a Femto slider to that of the performance of an exemplary slider in accordance with some embodiments.

Figure 1:
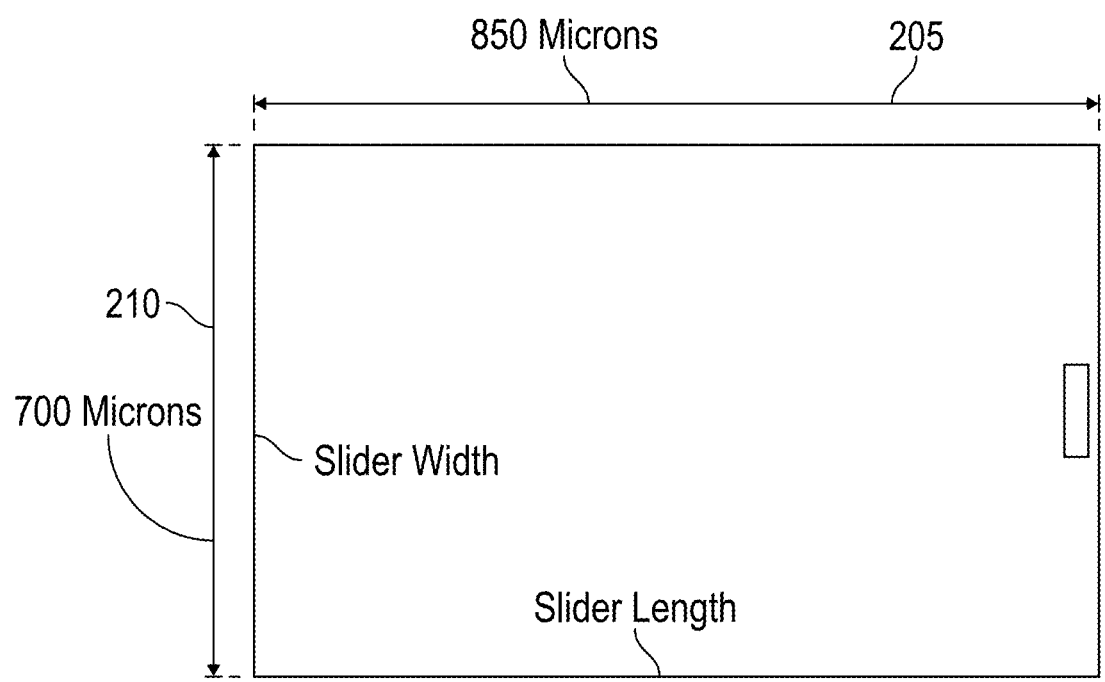
FIG. 1 shows dimensions of Femto slider.

To facilitate understanding, identical reference numerals have been used, where possible, to designate identical elements that are common to the figures. It is contemplated that elements disclosed in one embodiment may be beneficially utilized in other embodiments without specific recitation. Moreover, unless otherwise stated, the description of an element in the context of one drawing is applicable to other drawings illustrating that element.

DETAILED DESCRIPTION

The aspect ratio (AR) of a slider is the ratio of its length (in the downtrack direction) to its width (in the crosstrack direction). Sliders used in the hard disk drive industry today, which are standardized by the International Disk Drive Equipment and Materials Association (IDEMA), have an aspect ratio greater than 1 (i.e., the length of the slider is strictly greater than the width). FIG. 1 illustrates a slider in compliance with the Femto standard. As shown, the slider has a length 205 of 850 microns and a width 210 of 700 microns. To date, a slider length 205 of 850 microns has generally been considered in the art to be necessary to allow the design of an ABS that will generate sufficient air-bearing force and stiffness.

It is difficult for sliders with AR>1 to meet stiffer roll requirements for ABS designs without adversely affecting other aspects of performance. High-AR sliders (considered herein to be sliders with AR>1) also limit some slider fabrication operation efficiencies, specifically in lapping and grinding processes.

Disclosed herein are slider designs that provide improved air bearing roll stiffness and also allow for improvements in manufacturing efficiency and yield. In contrast to conventional sliders, in which the aspect ratio is greater than 1, the sliders disclosed herein have a low aspect ratio, meaning their width is greater than or equal to their length (i.e., the aspect ratio is less than or equal to 1).

Figure 2:
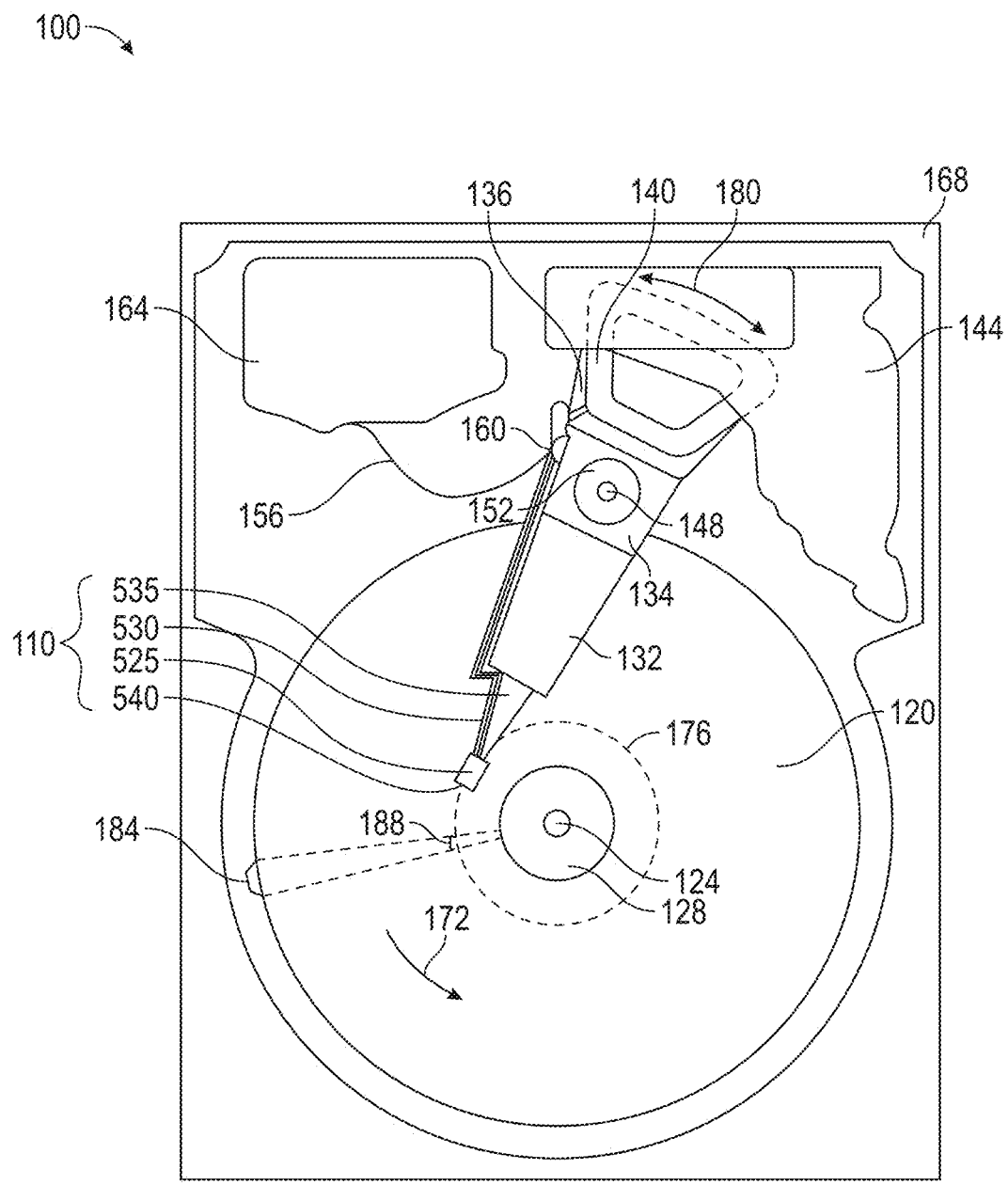
FIG. 2 is a diagram of an exemplary data storage device that can include embodiments of the sliders disclosed herein.

FIG. 2 is a plan view illustrating an example of a data storage device, namely a hard disk drive (HDD) 100, that may include one or more of the embodiments disclosed herein. FIG. 2 illustrates an example of the functional arrangement of components of the HDD 100, including a slider 525 that includes a magnetic recording head 540. The head 540 (also referred to herein as a transducer or a read/write transducer) includes a write element and a read element for respectively writing and reading information stored on a media 120 of the HDD 100. The HDD 100 includes at least one head gimbal assembly (HGA) 110, which includes the slider 525, a suspension 530 attached to the slider 525, and a load beam 535 attached to the suspension 530. The HDD 100 also includes at least one magnetic-recording media 120 rotatably mounted on a spindle 124 and a drive motor (not shown) attached to the spindle 124 for rotating the media 120. The media 120, which may include a plurality of disks, may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134, and a stator 144 including a voice-coil magnet. The armature 136 of the VCM is attached to the carriage 134 and is configured to move the arm 132 and the HGA 110 to access portions of the media 120. The carriage 134 is mounted on a pivot-shaft 148 with an interposed pivot-bearing assembly 152. In the case of a HDD having multiple disks (also sometimes referred to as "platters"), the carriage 134 may be called an "E-block," or comb, because the carriage 134 is arranged to carry a ganged array of arms 132 that gives it the appearance of a comb.

An assembly comprising a head gimbal assembly (e.g., HGA 110), including a suspension flexure to which the slider 525 is coupled, an actuator arm (e.g., arm 132) to which the suspension is coupled, and an actuator (e.g., the VCM) to which the actuator arm is coupled, may be collectively referred to as a head stack assembly (HSA). The HSA also includes a suspension tail. Generally, a HSA is the assembly configured to move the slider 525 to enable the head 540 to access portions of the media 120 (e.g., magnetic-recording disks) for read and write operations.

In accordance with some embodiments, electrical signals (for example, current to the voice coil 140 of the VCM, write signals to and read signals from the head 540, etc.) are provided by a flexible interconnect cable 156 ("flex cable"). Interconnection between the flex cable 156 and the head 540 may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feed-throughs provided by a HDD housing 168. The HDD housing 168, in conjunction with a HDD cover (not shown), provides a sealed, protective enclosure for the information storage components of the HDD 100.

In accordance with some embodiments, other electronic components, including a disk controller and servo electronics such as a digital-signal processor (DSP), provide electrical signals to the drive motor, the voice coil 140 of the VCM, and the head 540 of the HGA 110. The electrical signal provided to the drive motor enables the drive motor to spin, thereby providing a torque to the spindle 124, which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 525 rides so that the slider 525 flies above the surface of the media 120 without making contact with a thin magnetic-recording medium of the media 120 in which information is recorded.

The electrical signal provided to the voice coil 140 of the VCM enables the head 540 of the HGA 110 to access a track 176 on which information is recorded. Thus, the armature 136 of the VCM swings through an arc 180, which enables the HGA 110 attached to the armature 136 by the arm 132 to access various tracks on the media 120. Information is stored on the media 120 in a plurality of sectored tracks arranged in sectors on the media 120, for example, sector 184. Correspondingly, each track is composed of a plurality of sectored track portions, for example, sectored track portion 188. Each sectored track portion 188 includes recorded data and a header containing a servo-burst-signal pattern, for example, an ABCD-servo-burst-signal pattern, information that identifies the track 176, and error correction code information. In accessing the track 176, the read element of the head 540 of the HGA 110 reads the servo-burst-signal pattern, which provides a position-error-signal (PES) to the servo electronics, which controls the electrical signal provided to the voice coil 140 of the VCM, enabling the head 540 to follow the track 176. Upon finding the track 176 and identifying a particular sectored track portion 188, the head 540 either reads data from the track 176 or writes data to the track 176, depending on instructions received by the disk controller from an external agent, for example, a microprocessor of a computer system to which the HDD 100 is connected.

For reading the information stored on the media 120, the head 540 may include only one read sensor, or it may include multiple read sensors. The read sensor(s) in the head 540 may include, for example, one or more giant magnetoresistance (GMR) sensors, tunneling magnetoresistance (TMR) sensors, or another type of magnetoresistive sensor. When the slider 525 passes over a track 176 on the media 120, the head 540 detects changes in resistance due to magnetic field variations recorded on the media 120, which represent the recorded bits.

References herein to a hard disk drive, such as HDD 100 illustrated and described in reference to FIG. 2, may encompass an information storage device that is at times referred to as a "hybrid drive." A hybrid drive refers generally to a storage device having functionality of both a traditional HDD (see, e.g., HDD 100) combined with a solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, e.g., a traditional HDD and a SSD, with either one or multiple interfaces for host connection.

Figure 3A:
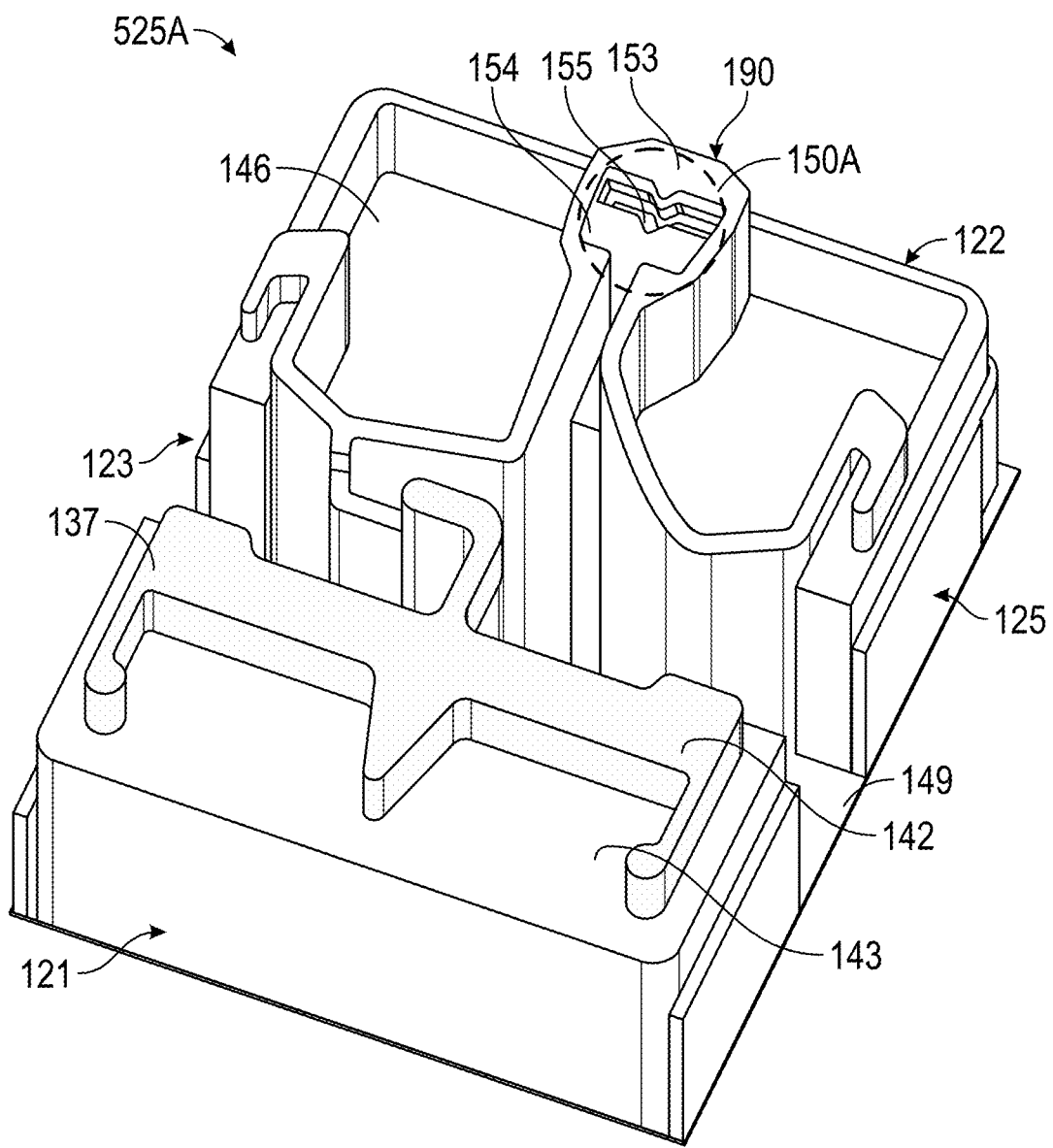
FIG. 3A is a perspective view of a slider.
Figure 3B:
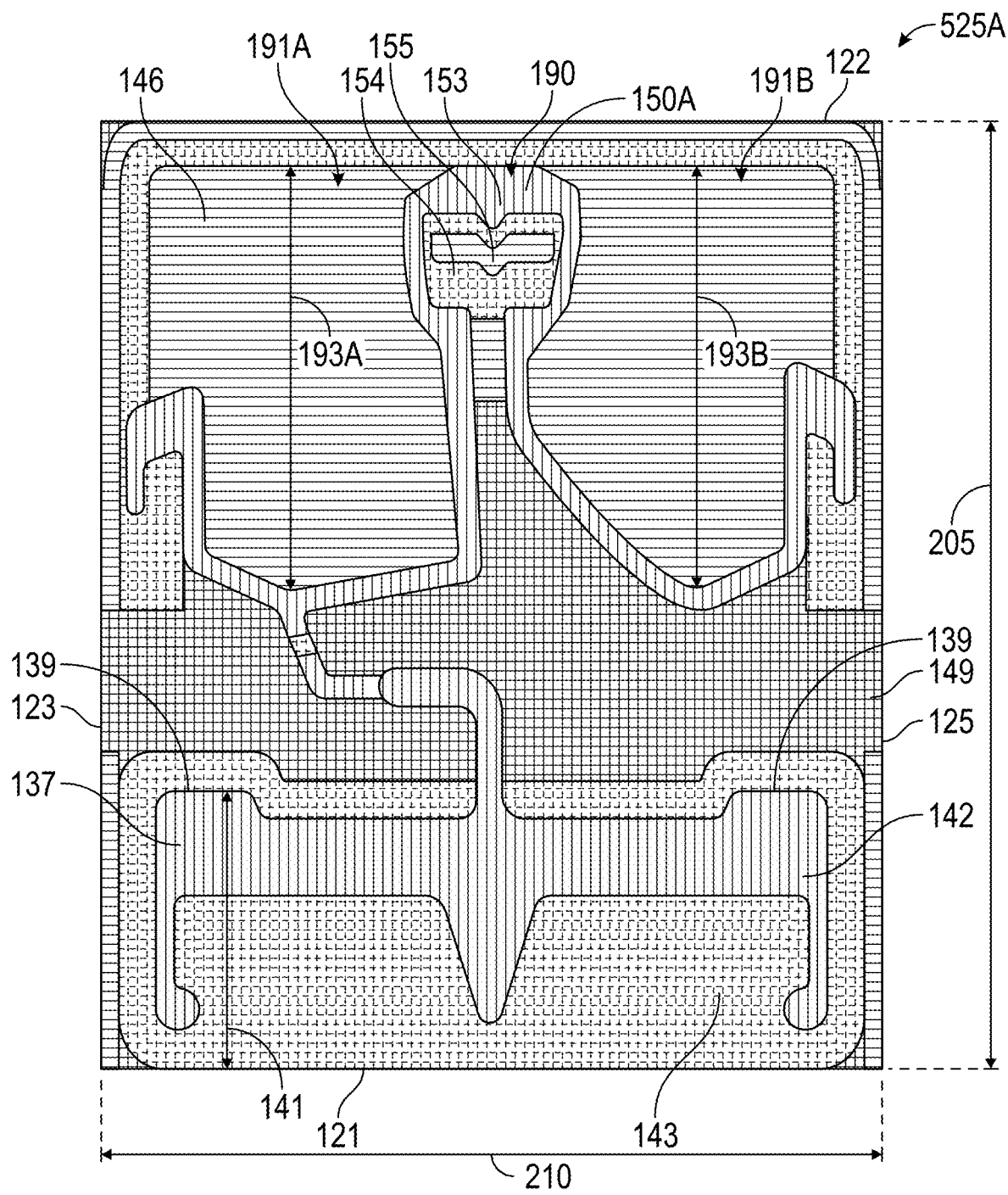
FIG. 3B is an ABS view of the slider shown in FIG. 3A.

FIG. 3A is a perspective view of a slider 525A, and FIG. 3B is an ABS view of the slider 525A of FIG. 3A. The slider 525A has an aspect ratio greater than 1 (i.e., its length 205 is greater than its width 210). If the slider 525A is an IDEMA-standard Femto slider 525A (e.g., described in the context of FIG. 1), the length 205 is 850 microns, and the width 210 is 700 microns.

FIG. 3A illustrates the slider 525A with the ABS oriented upward. It is to be understood that when the slider 525A is installed in a data storage device (e.g., HDD 100 shown in FIG. 2), the ABS will be oriented downward, facing the media 120.

As shown in FIGS. 3A and 3B, the slider 525A has a leading edge 121 (also referred to as the leading surface), a trailing edge 122 (also referred to as the trailing surface) opposite the leading edge 121, a first side edge 123 (also referred to as the first side surface) extending between the leading edge 121 and the trailing edge 122, and a second side edge 125 (also referred to as the second side surface) opposite the first side edge 123 and extending between the leading edge 121 and the trailing edge 122. As shown in FIGS. 3A and 3B, the leading edge 121 and the trailing edge 122 are parallel to each other and perpendicular to both of the first side edge 123 and the second side edge 125.

The ABS of the exemplary slider 525A illustrated in FIGS. 3A and 3B includes various features. For example, the ABS of the slider 525A includes a trailing-edge pad 190 with an efficiency-flattening hole (EFH) 150A. The purpose of the EFH 150A is to store air or gas and re-direct it onto the protruding read/write head element (located on the trailing pad 190 near the trailing edge 122) in a substantially uniform way as the slider 525A flies over the media 120, regardless of the location of the slider 525A over the media 120 (e.g., regardless of whether the slider flies near the inner diameter, outer diameter, or somewhere in between). As shown in FIGS. 3A and 3B, the EFH 150A has a protrusion away from the trailing edge 122 and in the direction toward the leading edge 121. Efficiency-flattening holes like the EFH 150A are described in detail in U.S. Pat. No. 9,691,422, the entirety of the contents of which is hereby incorporated by reference for all purposes.

The slider 525A shown in FIGS. 3A and 3B also includes two cavities, 191A and 191B, on either side of the trailing-edge pad 190. Each cavity 191A, 191B is surrounded and enclosed by a cavity wall, and each cavity 191A, 191B has a flat, uniform floor at a single level. Each of the cavities 191A, 191B has a maximum cavity length. The maximum cavity length is the maximum distance between the portion of the cavity near the trailing edge 122 and the point(s) of the cavity furthest from the trailing edge 122 in the direction that is perpendicular to the trailing edge 122. As shown, the cavity 191A has a maximum cavity length 193A, and the cavity 191B has a maximum cavity length 193B. The maximum cavity lengths 193A and 193B may be identical, or they may be different.

The slider 525A shown in FIGS. 3A and 3B also includes a leading pad 137. The leading pad 137 has a back edge 139. The back edge 139 is a distance 141 from the leading edge 121.

In the slider 525A, the ratio of each of the maximum cavity lengths 193A, 193B to the distance 141 is between approximately 1 and 1.2. The resulting roll stiffness of the slider 525A shown in FIGS. 3A and 3B is approximately 0.0126 Nm/radian.

Figure 4A:
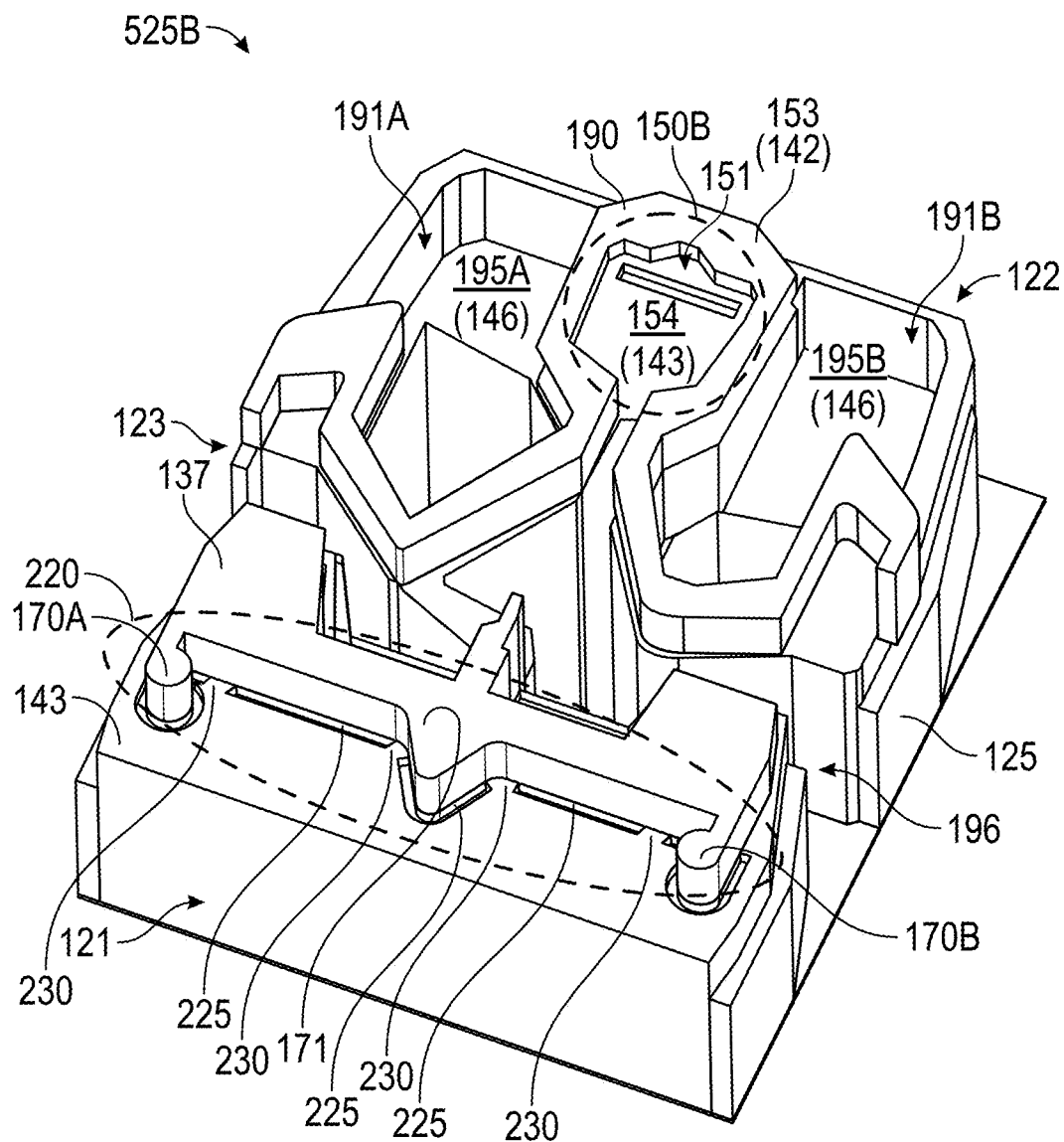
FIG. 4A is a perspective view of an exemplary low-aspect-ratio slider in accordance with some embodiments.
Figure 4B:
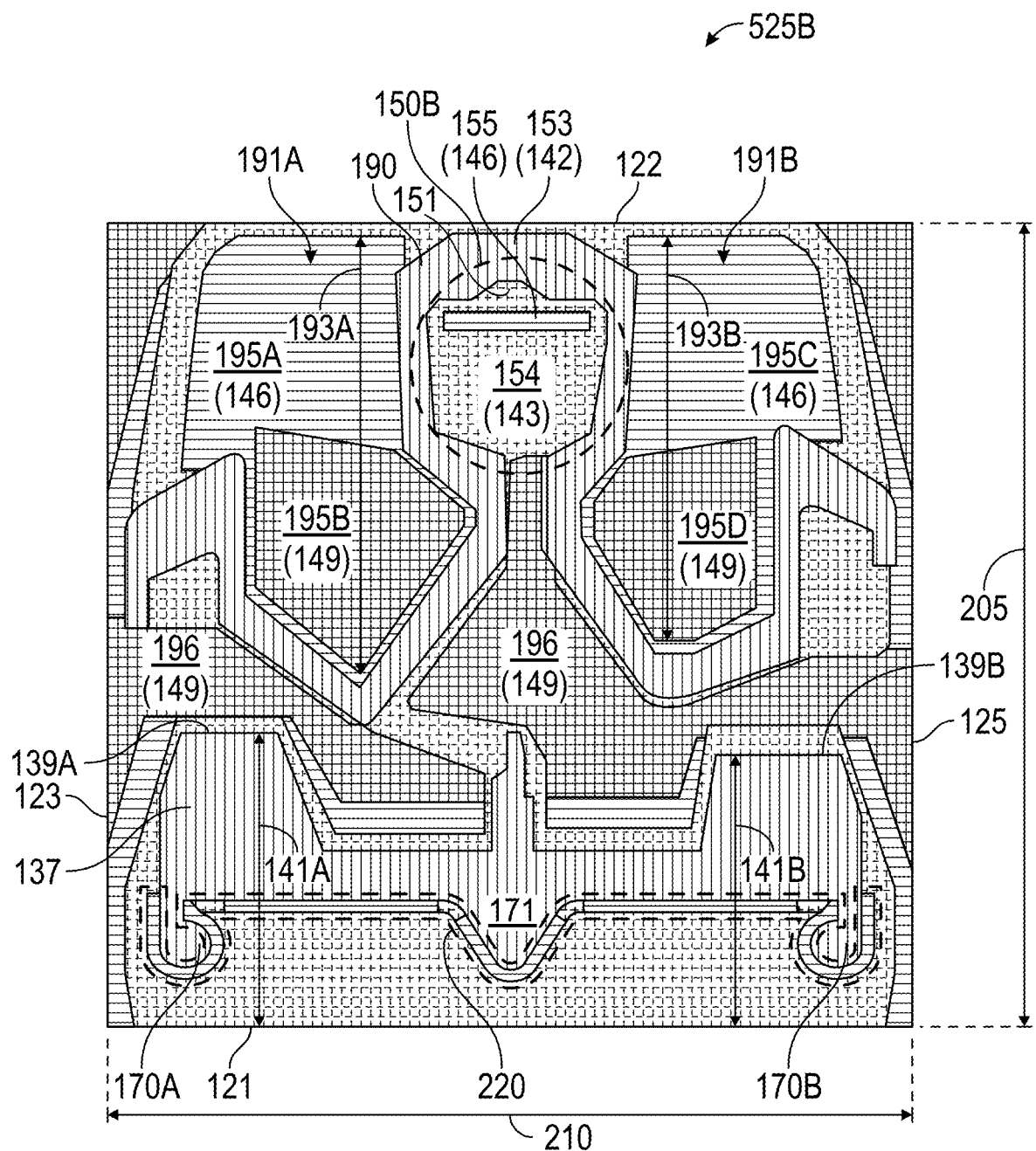
FIG. 4B is an ABS view of the exemplary slider of FIG. 4A.

FIG. 4A is a perspective view of an exemplary low-aspect-ratio slider 525B in accordance with some embodiments, and FIG. 4B is an ABS view of the exemplary slider 525B of FIG. 4A. Unlike the slider 525A, the slider 525B has an aspect ratio that is less than or equal to 1 (i.e., the length 205 is less than or equal to the width 210). In some embodiments, each of the length 205 and the width 210 is less than 850 microns. For example, each of the length 205 and width 210 may be between about 600 microns and about 800 microns. In some embodiments, the length 205 and width 210 are both approximately 700 microns, thus making the slider 525B have an approximately square perimeter in the ABS view of FIG. 4B.

Conventional wisdom would lead one of ordinary skill in the art to conclude that the low aspect ratio of the slider 525B would compromise the air-bearing stiffness needed to counteract the external forces, and thus creating difficulties in maintaining minimal variations in flying height. As explained below, however, the ABS of the slider 525B is designed such that low-aspect-ratio slider 525B meets stiffer roll requirements without a significant performance degradation. Indeed, in some respects, as described further below, e.g., in the discussion of FIGS. 6A-6D, the performance of the exemplary slider 525B is better than the performance of the larger Femto slider (e.g., the slider 525A shown in FIGS. 3A and 3B).

FIG. 4A illustrates the exemplary slider 525B with the ABS oriented upward. It is to be understood that when the slider 525B is installed in a data storage device (e.g., HDD 100 shown in FIG. 2), the ABS will be oriented downward, facing the media 120.

Like the slider 525A, the exemplary slider 525B has a leading edge 121 (also referred to as the leading surface), a trailing edge 122 (also referred to as the trailing surface) opposite the leading edge 121, a first side edge 123 (also referred to as the first side surface) extending between the leading edge 121 and the trailing edge 122, and a second side edge 125 (also referred to as the second side surface) opposite the first side edge 123 and extending between the leading edge 121 and the trailing edge 122. FIGS. 4A and 4B illustrate the leading edge 121 and the trailing edge 122 as parallel to each other and perpendicular to both of the first side edge 123 and the second side edge 125, but, in general, the surfaces of the slider 525B need not be parallel and/or perpendicular to each other. In other words, non-rectangular sliders 525B are contemplated and are within the scope of the disclosures herein.

The exemplary slider 525B illustrated in FIGS. 4A and 4B has an ABS with four levels 142, 143, 146, and 149. With the slider 525B in an orientation in which the ABS is oriented facing upward, the level 142 is illustrated and described as being above the levels 143, 146, and 149; the level 143 is illustrated and described as being below the level 142 and above the levels 146 and 149; the level 146 is illustrated and described as being below the levels 142 and 143 and above the level 149; and the level 149 is illustrated and described as being below the levels 142, 143, and 146. It is to be understood that when the slider 525B is installed in the HDD 100 illustrated in FIG. 2, the ABS will be oriented downward, toward the disk. Consequently, the level 142 will be the level closest to the media 120, making it the lowest level, and levels 143, 146, and 149 will be progressively further away from the media 120. In some embodiments, certain portions labeled with the same level reference number in FIG. 4B may have some variations of levels within a range.

The second level 143 may be, for example, between approximately 100 nm and 200 nm below the first level 142, and the third level 146 may be, for example, between approximately 300 nm and 2000 nm below the second level. As an example, the second level 143 may be approximately 120 nm below the first level 142, and the third level 146 may be approximately 700-1000 nm below the second level 143.

Like the slider 525A, the exemplary slider 525B illustrated in FIGS. 4A and 4B includes various features, some of which are similar to those shown in FIGS. 3A and 3B. Many of the ABS features of the slider 525B differ from those in the slider 525A so that the ABS of the slider 525B provides the desired performance characteristics.

The slider 525B includes a trailing-edge pad 190 with an EFH 150B. The trailing-edge pad 190 has a first surface 153 at the first level 142. For clarity, FIG. 4B adopts the convention of providing the reference number of the surface followed by the reference number of the level in parentheses (that is, as [surface reference number] ([level reference number])). Accordingly, the first surface 153, at the first level 142, is labeled in FIG. 4B as "153 (142)." In the illustrated embodiments, the first surface 153 is substantially perpendicular to the leading edge 121, the trailing edge 122, the first side edge 123, and the second side edge 125. The EFH 150B has a second surface 154 at the second level 143, the second level 143 being below the first level 142 when the slider 525B is oriented with the ABS upward, as shown in FIG. 4A. In the illustrated embodiments of FIGS. 4A and 4B, the second surface 154 is substantially parallel to the first surface 153. The EFH 150B also has a third surface 155 at the third level 146. The third level 146 is below the second level 143. The third surface 155 may be substantially parallel to the first surface 153 and the second surface 154. At least a portion of the EFH 150B (e.g., the third surface 155) may be formed using shallow ion milling (SIM). Like the EFH 150A, the EFH 150B stores air or gas and re-directs it onto the protruding read/write head element (on the trailing pad 190 near the trailing edge 122) in a substantially uniform way as the slider 525B flies over the media 120, regardless of the location of the slider 525B over the media 120 (e.g., regardless of whether the slider flies near the inner diameter, outer diameter, or somewhere in between).

As shown in FIGS. 4A and 4B, the EFH 150B has a protrusion. Unlike the EFH 150A, which has a protrusion in the direction toward the leading edge 121, in the exemplary slider 525B, the EFH 150B includes a protrusion 151 in the direction toward the trailing edge 122. The protrusion 151 is in the surface 154 that is at the second level 143.

The slider 525B shown in FIGS. 4A and 4B also includes two cavities, 191A and 191B, on either side of the trailing-edge pad 190. A first cavity 191A is between a first side of the trailing-edge pad 190 and the first side edge 123, and a second cavity 191B is between a second side of the trailing-edge pad 190 and the second side edge 125. The cavities 191A, 191B are discrete and do not intersect each other. As shown in FIG. 4A, each cavity 191A, 191B is surrounded and enclosed by a cavity wall. In the exemplary slider 525B, each of the cavities 191A, 191B has a floor with two surfaces. Specifically, the cavity 191A has a floor with a first surface 195A at the third level 146 and a second surface 195B at the fourth level 149. Similarly, the cavity 191B has a floor with a first surface 195C at the third level 146 and a second surface 195D at the fourth level 149. (Again, the levels are shown in parentheses.) The shapes and dimensions of the cavities 191A, 191B and the shapes and dimensions of the first surfaces 195A, 195C and the second surfaces 195B, 195D may be selected and/or optimized to imbue the slider 525B with desired flying characteristics. Specifically, the shapes and characteristics of the individual surfaces 195A, 195B, 195C, and 195D of the cavities 191A, 191B may be designed to compensate for degradations that could otherwise result in fly height, lift, etc. caused by the reduction in the slider length 205 relative to the slider width 210 in low-aspect-ratio sliders such as the slider 525B. The surfaces 195A, 195B, 195C, and 195D may have any suitable characteristics. For example, they may be flat, smooth, sloped, regular, irregular, etc. Moreover, the transitions between the first surfaces 195A, 195C and the second surfaces 195B, 195D may be substantially vertical, sloped, stepped, etc.

The cavity 191A has a maximum cavity length 193A, and the cavity 191B has a maximum cavity length 193B. (The maximum cavity length was described above in the context of FIGS. 3A and 3B, and that description applies here.) The maximum cavity lengths 193A and 193B may be substantially identical, or they may be different.

The exemplary slider 525B shown in FIGS. 4A and 4B also includes a leading pad 137. The leading pad 137 has a center protrusion 171, a first side protrusion 170A, and a second side protrusion 170B, each of which extends toward the leading surface 121. In addition, the leading pad 137 has a first back edge 139A at a distance 141A from the leading edge 121 and a second back edge 139B at a distance 141B from the leading edge 121. As shown in the exemplary embodiment of FIGS. 4A and 4B, the distances 141A and 141B may be different (e.g., the leading pad 137 may be asymmetrical about the slider 525B centerline to achieve desired flying characteristics). Alternatively, the distances 141A and 141B may be substantially the same. The leading pad 137 is separated from the first and second cavities 191A and 191B by a chasm 196, which may have multiple parts.

The exemplary slider 525B also includes a particle-trapping structure 220, which is next to the base of the leading pad 137. The particle-trapping structure 220 has a path that follows a portion of the base of the leading pad 137 (namely, the center protrusion 171, parts of the first and second side protrusions 170A, 170B, and the rest of the leading pad 137 that faces the leading edge 121). In general, the particle-trapping structure 220 may be touching the base of the leading pad 137, or it may be offset from the base of the leading pad 137. The particle-trapping structure 220 is disposed between the leading pad 137 and the leading edge 121.

The particle-trapping structure 220 comprises a plurality of (i.e., at least two) particle-trapping segments 225 and at least one gap 230, several of which are labeled in FIG. 4A. Each gap 230 is disposed between two adjacent particle-trapping segments 225 (e.g., as shown in FIG. 4A). In other words, each pair of adjacent particle-trapping segments 225 is separated by a gap 230. Each particle-trapping segment 225 has a floor. The floor, which may be level or sloped, smooth or non-smooth, uniform or irregular, is characterized by at least one level that is below the base of the leading pad 137. In other words, the floors of the particle-trapping segments 225 are below the second level 143 when the slider 525B is in an orientation in which the ABS faces upward. Particle-trapping structures are described in detail in U.S. Pat. No. 10,354,685, the entirety of which is hereby incorporated by reference for all purposes.

The cavities 191A, 191B of the exemplary slider 525B are longer relative to the leading air bearing surface dimensions of the slider 525B than are the cavities 191A, 191B of the slider 525A relative to the leading air bearing surface dimensions of the slider 525A. For example, in the exemplary slider 525B shown in FIGS. 4A and 4B, the ratio of each of the maximum cavity lengths 193A, 193B to the respective distance 141A, 141B is larger than described above for the slider 525A shown in FIGS. 3A and 3B. As explained above, for the slider 525A, the ratio is between about 1 and about 1.2. In the slider 525B, the ratio of each of the maximum cavity lengths 193A, 193B to the distance 141 is greater than about 1.2. For example, the ratio may be between approximately 1.3 and 1.5. Specifically, the ratio may be, for example, approximately 1.4. Because the cavities 191A and 191B are longer (larger) relative to the leading ABS dimensions, the roll stiffness of the slider 525B shown in FIGS. 4A and 4B is significantly higher than that of the slider 525A shown in FIGS. 3A and 3B. For example, the roll stiffness may be approximately 0.019 Nm/radian, or approximately 50% higher than the roll stiffness of the slider 525A illustrated and described in the context of FIGS. 3A and 3B.

FIGS. 5A, 5B, and 5C compare the aspect ratio of a conventional slider 525C to the aspect ratios of exemplary low-AR sliders 525D and 525E in accordance with some embodiments. As shown in FIG. 5A, the length 205 of a conventional slider 525C is larger than its width 210 (i.e., AR>1). In contrast, as shown in FIGS. 5B and 5C, the low-AR sliders disclosed herein have a width 210 that is at least as large as their length 205 (i.e., AR≤1). FIG. 5B illustrates an exemplary slider 525D in which the width 210 is larger than the length 205 (AR<1), and FIG. 5C illustrates an exemplary slider 525E in which the length 205 and width 210 are substantially equal (AR=1). In some embodiments of the sliders disclosed herein, the length 205 is less than 850 microns (e.g., the length 205 may be 700 microns). For example, the length 205 of either the slider 525D or the slider 525E may be less than 850 microns and, therefore, shorter than a standard Femto slider.

As explained above, during the slider manufacturing process, it is desirable to precisely control the alignment of each individual read/write transducer's read head element and write head element relative to each other. U.S. patent application Ser. No. 15/847,738, which published on Jul. 5, 2018 as U.S. Patent Publication No. 2018/0185977, the entirety of which is hereby incorporated by reference for all purposes, describes a lapping mount tool and processes to lap a row of magnetic read-write head sliders. The lapping mount tool is able to apply a differential pressure to every slider in a physical row bar so that the read/write offset of the recording head of each slider can be tuned to improve performance and yield. Only so much differential pressure can be applied to each slider, however, and the application of too much differential pressure can result in the slider rolling undesirably during data storage device operation. Furthermore, the length of the sliders is inversely proportional to the number of sliders that can be placed onto the row bar carriers during manufacturing.

The low-aspect-ratio sliders disclosed herein address both of these problems. Because the length 205 of the disclosed low-AR sliders is smaller than the length 205 of Femto sliders, a larger differential pressure can be applied with less risk of deformations that result in increased rolling during flight, and therefore without substantially degrading the minimum fly-height clearance. Furthermore, because of the reduction in slider length, more sliders can be placed onto the row bar carriers, thereby increasing the number of sliders that can be processed during each manufacturing step (e.g., vacuum steps, etch steps, etc.). The expected improvement in batch loading is about 18 percent, and the expected improvement in lapping efficiency is on the order of 10 percent. Thus, the smaller dimensions of the low-AR sliders disclosed herein translate directly to performance gains, and improvements in manufacturing efficiency and yield.

Figure 6B:
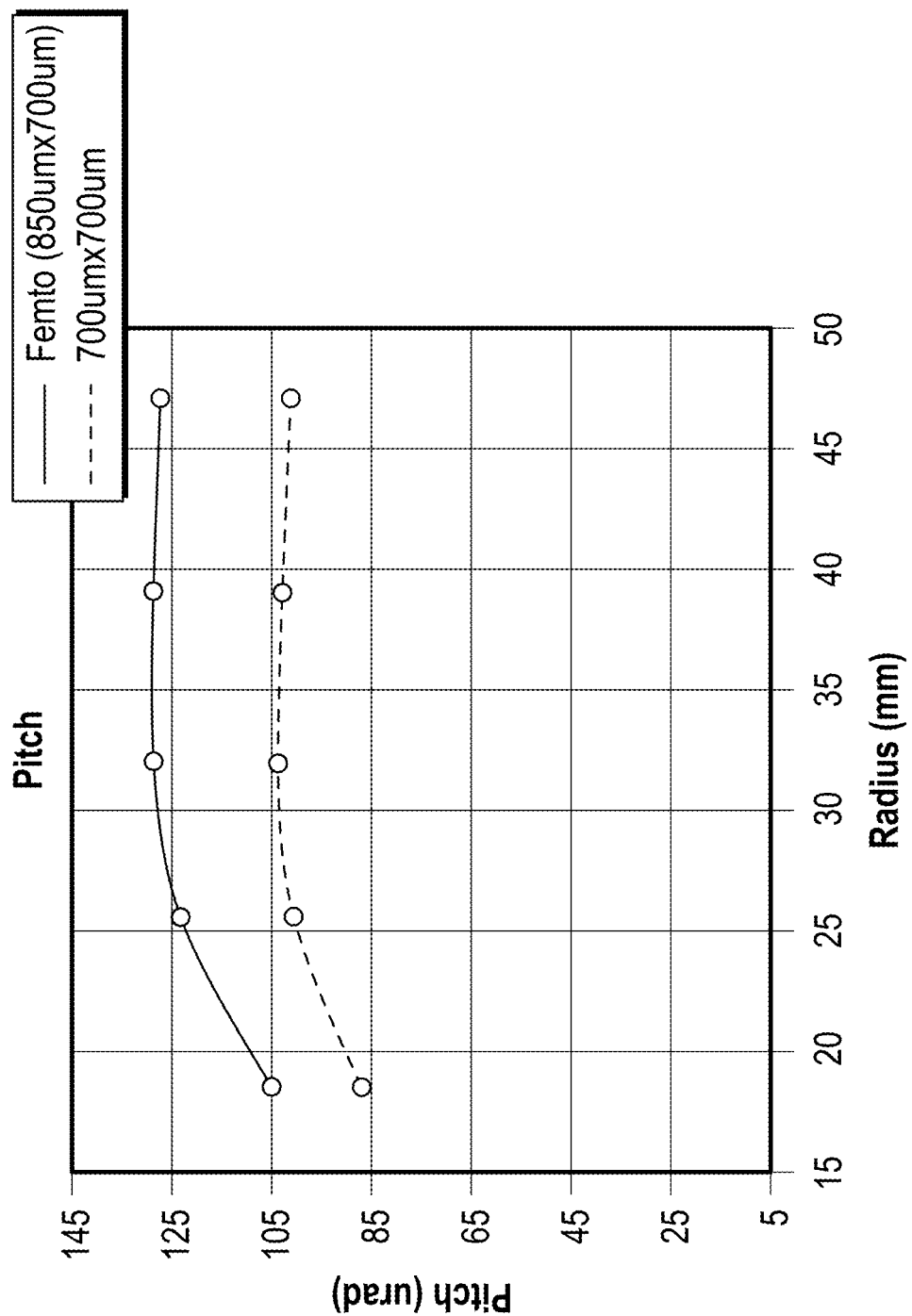

FIGS. 6A, 6B, 6C, and 6D compare the performance of an exemplary embodiment of the slider 525B, illustrated in FIGS. 4A and 4B, to that of the slider 525A, illustrated in FIGS. 3A and 3B. The length 205 of the slider 525A is 850 microns, and the width 210 is 700 microns (e.g., it is a Femto slider). The length 205 and width 210 of the low-AR slider 525B are both 700 microns. As shown in FIG. 6A, the flying heights of the two sliders 525A and 525B are similar or identical at all radii, but the low-AR slider 525B flies at a lower height for radii below about 40 mm.

FIG. 6B indicates that the pitch of the exemplary embodiment of the low-AR slider 525B is uniformly lower at all radii than the pitch of the Femto slider 525A.

Figure 6C:
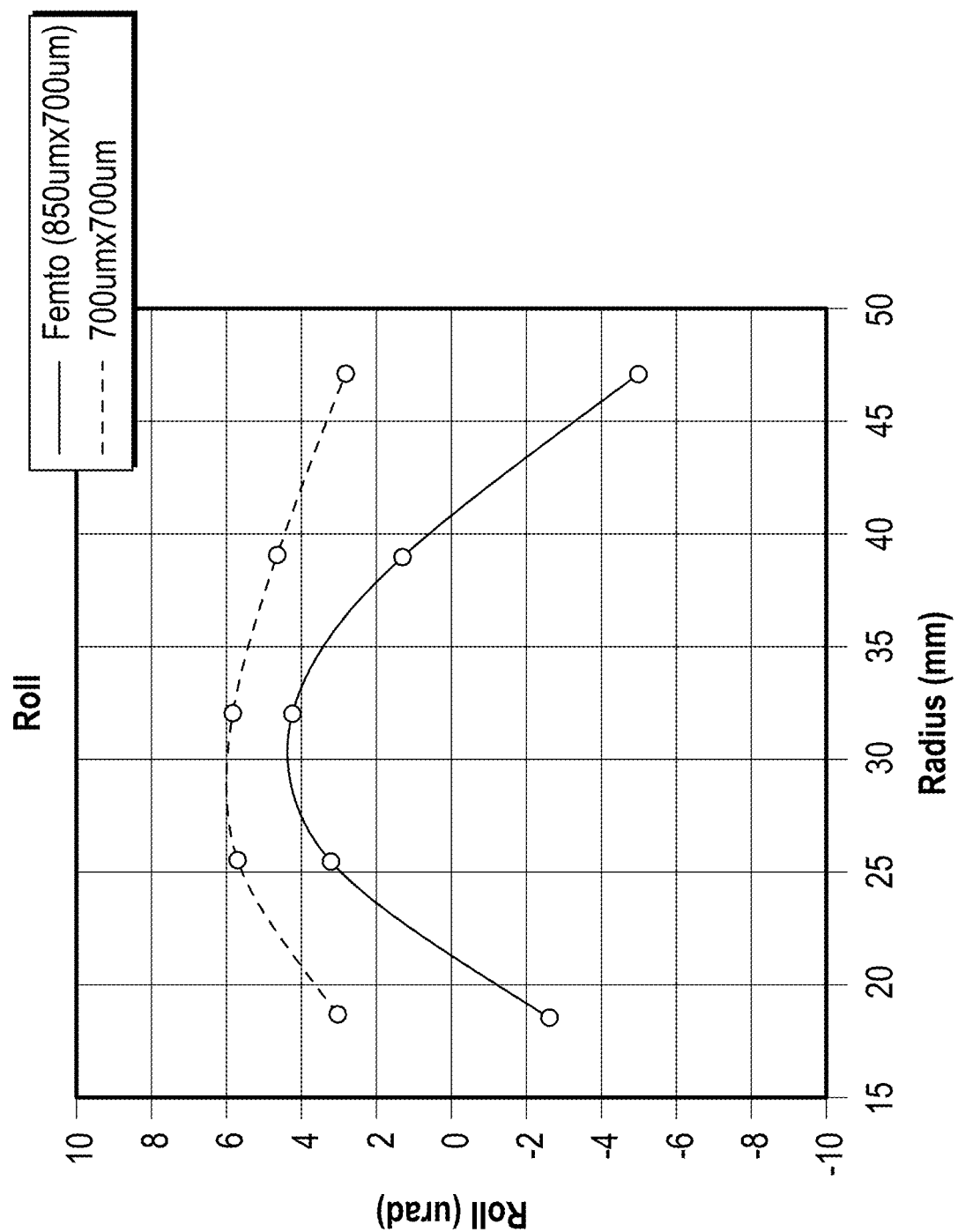
Figure 6D:
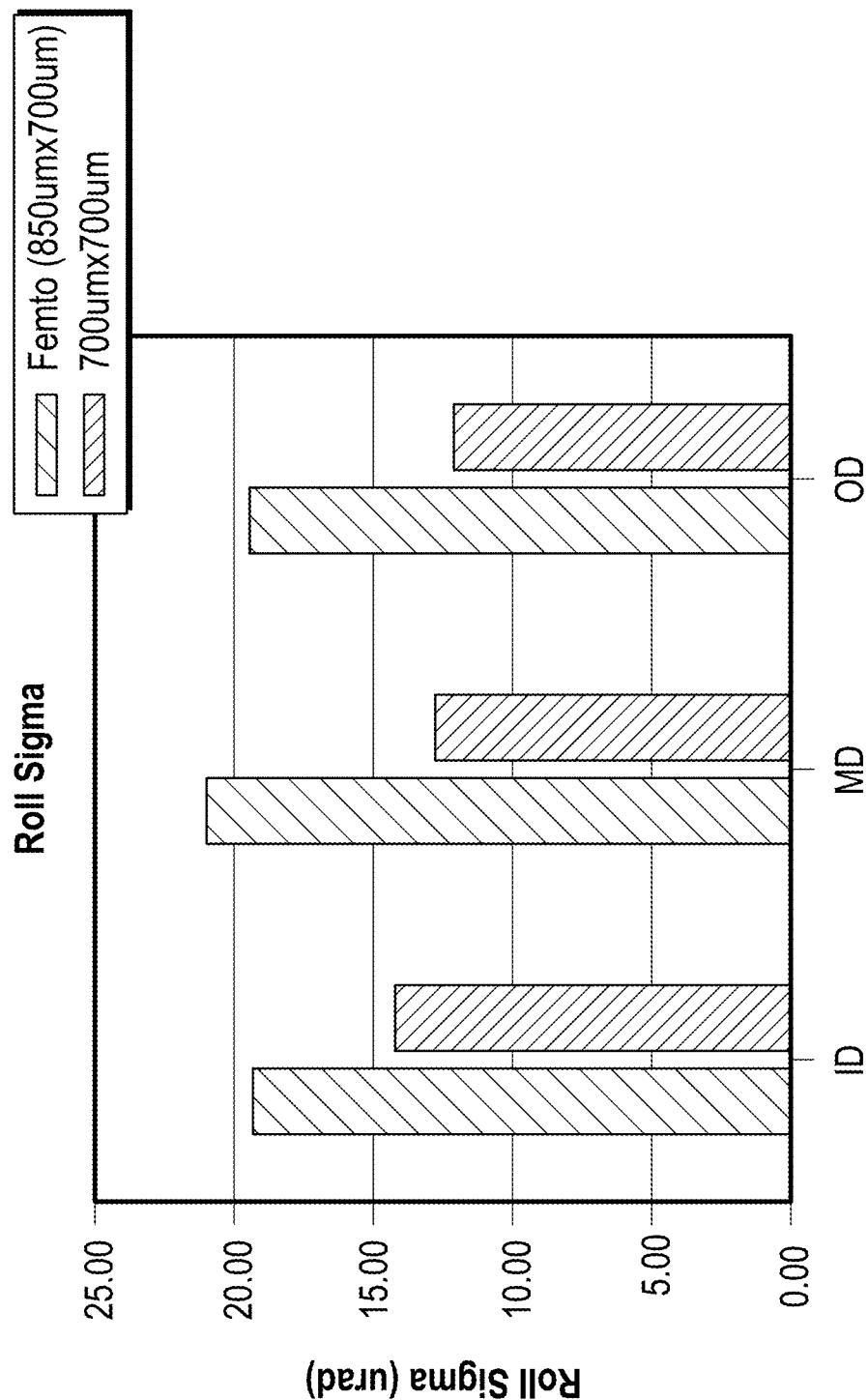

FIG. 6C shows that the roll of the exemplary embodiment of the low-AR slider 525B is uniformly marginally higher than the roll of the Femto slider 525A (but still within specifications), but there is less variation in the roll at different radii (e.g., the roll mean is more uniform). The reduction in roll variance is confirmed by FIG. 6D, which shows that the roll sigma is substantially lower for the exemplary embodiment of the low-AR slider 525B at all radii (inner diameter (ID), middle diameter (MD), and outer diameter (OD)). The improvement in roll sigma is approximately 34%. Thus, the low-AR slider 525B provides more margin for minimum fly-height clearance. In other words, the allowable reader/writer offset range is higher.

Another benefit of the low-AR sliders disclosed herein is that the stiffer ABS and lower mass of the low-AR sliders increases the roll frequency (e.g., the frequency at which, as it flies, the slider rocks to the left and right of the slider centerline) and the pitch frequency (e.g., the frequency at which, during flight, the slider pitches up and down with respect to a reference point, such as the slider center or trailing edge) relative to Femto sliders. As explained above in the discussion of FIG. 2, in the HDD 100 the slider 525 is attached to a suspension 530. The suspension 530 is characterized by a frequency that can, undesirably, resonate with the pitch and/or roll frequencies of the slider 525. The suspension 530 frequency may be, for example, between about 10 kHz and about 60 kHz.

The table below compares the roll and pitch frequencies at the inner diameter, the middle diameter, and the outer diameter of the Femto slider 525A (with a length 205 of 850 microns and a width 210 of 700 microns) to those of an exemplary embodiment of the low-AR slider 525B (here, with an example length 205 and width 210 both equal to 700 microns):

|  | Femto slider 525A (850 × 700 μm) | | | Low-AR slider 525B (700 × 700 μm) | | |
| --- | --- | --- | --- | --- | --- | --- |
| Radius | ID | MD | OD | ID | MD | OD |
| Roll frequency (kHz) | 124 | 120 | 123 | 177 | 176 | 182 |
| Pitch frequency 1 (kHz) | 140 | 134 | 139 | 164 | 162 | 168 |
| Pitch frequency 2 (kHz) | 313 | 334 | 360 | 416 | 414 | 432 |

As the table shows, at each radius, the pitch and roll frequencies are uniformly higher for the exemplary embodiment of the low-AR slider 525B. For example, the roll frequency of the exemplary low-AR slider 525B is consistently higher by at least 50 kHz than the roll frequency of the Femto slider 525A, representing an improvement of about 46%. The pitch frequencies are also higher at each radius (e.g., by about 30% on average). Thus, by providing substantially higher pitch and roll frequencies than the Femto slider 525A, the low-AR slider 525B mitigates the likelihood of problematic resonance between the slider 525B and the suspension 530, which allows more freedom in the design of the suspension 530.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales (e.g., if the units of a measurement are meters, two features having lengths of 1.000 m and 1.001 m would have substantially equal lengths). As another example, a structure that is "substantially vertical" would be considered to be vertical for all practical purposes, even if it is not precisely at 90 degrees relative to horizontal.

The words "first," "second," "third," and similar words are used to distinguish between like elements and not to indicate any particular order of or relationship between those elements.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A slider, comprising:
   a leading edge having a first length;
   a trailing edge having a second length;
   a first side edge having a third length;
   a second side edge having a fourth length;
   a trailing-edge pad;
   a first cavity between a first side of the trailing-edge pad and the first side edge; and
   a second cavity between a second side of the trailing-edge pad and the second side edge, the second cavity not intersecting the first cavity,
   wherein at least one of the first length or the second length is greater than or equal to at least one of the third length or the fourth length.

2. The slider recited in claim 1, wherein each of the third and fourth lengths is less than 850 microns.

3. The slider recited in claim 1, wherein the first, second, third, and fourth lengths are substantially equal.

4. The slider recited in claim 3, wherein each of the first, second, third, and fourth lengths is about 700 microns.

5. The slider recited in claim 1, wherein at least one of the first or second cavities comprises at least two surfaces bounded by a wall.

6. The slider recited in claim 5, wherein the at least two surfaces comprise a first surface at a first level and a second surface at a second level that is different from the first level.

7. The slider recited in claim 1, further comprising a leading pad disposed between the first and second cavities and the leading edge and separated from the first and second cavities by a chasm, the leading pad having a back edge at a first distance from the leading edge, and wherein a ratio of a maximum cavity length to the first distance is greater than about 1.25.

8. The slider recited in claim 1, wherein the trailing-edge pad comprises an efficiency-flattening hole.

9. A head gimbal assembly comprising the slider recited in claim 1.

10. A data storage device comprising the slider recited in claim 1.

11. A slider, comprising:
    a leading surface;
    a trailing surface;
    a first side surface;
    a second side surface; and
    an air-bearing surface (ABS) comprising a leading pad, wherein:
    the leading pad comprises a center protrusion, a first side protrusion, and a second side protrusion, each of the center protrusion, first side protrusion, and second side protrusion extending toward the leading surface, and a width of the slider is greater than or equal to a length of the slider.

12. The slider recited in claim 11, wherein a roll stiffness of the slider is greater than about 0.013 NMm/rad.

13. The slider recited in claim 11, wherein each of the width of the slider and the length of the slider is between about 650 microns and about 800 microns.

14. The slider recited in claim 11, wherein the length of the slider is substantially equal to the width of the slider.

15. The slider recited in claim 14, wherein the length of the slider is about 700 microns.

16. The slider recited in claim 11, further comprising at least one particle trapping structure disposed between the leading pad and the leading surface.

17. The slider recited in claim 16, wherein the particle trapping structure comprises a plurality of segments, wherein, in an orientation in which the ABS of the slider is oriented upward, a level of each of the plurality of segments is below a base of the leading pad.

18. The slider recited in claim 16, wherein the at least one particle trapping structure is adjacent to a base of the leading pad.

19. The slider recited in claim 11, wherein the ABS further comprises a cavity adjacent to the trailing surface, the cavity being enclosed by a wall, the wall being separate from the leading pad, wherein a ratio of a maximum cavity length to a distance between the leading surface and a back edge of the leading pad is greater than about 1.2.

20. The slider recited in claim 19, wherein the ratio is at least 1.3.

21. A head gimbal assembly comprising the slider recited in claim 11.

22. A data storage device comprising the slider recited in claim 11.

23. A slider, comprising:

a leading edge;

a trailing edge parallel to the leading edge;

a first side edge intersecting and perpendicular to both the leading edge and the trailing edge;

a second side edge intersecting and perpendicular to both the leading edge and the trailing edge; and a trailing pad comprising an efficiency flattening hole, wherein a length of the leading and trailing edges is greater than or equal to a length of the first and second side edges.

24. The slider recited in claim 23, wherein:

the efficiency flattening hole comprises a first level and a second level, the second level being below the first level in an orientation in which the trailing pad is oriented upward, and the first level comprises a protrusion toward the trailing edge.

25. The slider recited in claim 24, wherein, in the orientation in which the trailing pad is oriented upward, the second level is between about 300 nm and about 2000 nm below the first level.

26. The slider recited in claim 23, wherein the length of the leading and trailing edges and the length of the first and second side edges is less than 850 microns.

27. The slider recited in claim 23, wherein the length of the leading and trailing edges is substantially equal to the length of the first and second side edges.

28. The slider recited in claim 27, wherein the length of the first and second side edges is about 700 microns.

29. A head gimbal assembly comprising the slider recited in claim 23.

30. A data storage device comprising the slider recited in claim 23.

* * * * *